United States Patent
Choi

(10) Patent No.: US 10,553,039 B2
(45) Date of Patent: Feb. 4, 2020

(54) SYSTEM AND METHOD FOR DIAGNOSING DETERIORATION OF A DRIVE BELT IN A VEHICLE

(71) Applicants: Hyundai Motor Company, Seoul (KR); Kia Motors Corporation, Seoul (KR)

(72) Inventor: Kwang-Seok Choi, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 284 days.

(21) Appl. No.: 15/810,560

(22) Filed: Nov. 13, 2017

(65) Prior Publication Data

US 2018/0174374 A1    Jun. 21, 2018

(30) Foreign Application Priority Data

Dec. 15, 2016  (KR) .................. 10-2016-0171447

(51) Int. Cl.
*B60L 9/00*  (2019.01)
*G07C 5/00*  (2006.01)
(Continued)

(52) U.S. Cl.
CPC .......... *G07C 5/006* (2013.01); *B60L 15/2009* (2013.01); *B60W 20/00* (2013.01);
(Continued)

(58) Field of Classification Search
CPC .... G07C 5/006; G07C 5/0825; G07C 5/0833; B60L 15/2009; B60L 2240/48; B60L 2240/423; B60L 2240/445; B60L 2240/421; B60L 50/15; B60L 7/10; B60L 3/0023; B60W 20/00; B60W 2050/0088; B60W 20/50; B60W 50/0098; F16H 57/01;
(Continued)

(56) References Cited

U.S. PATENT DOCUMENTS 10,029,695 B1 *  7/2018  Gibson ................. B60W 10/30
10,384,670 B2 *  8/2019  Choi ..................... B60W 50/14
(Continued)

FOREIGN PATENT DOCUMENTS

KR     10-2005-0001673 A    1/2005
KR     10-2013-0136780 A   12/2013
KR        10-1338463 B1    12/2013

*Primary Examiner* — Shardul D Patel
(74) *Attorney, Agent, or Firm* — Morgan, Lewis & Bockius LLP

(57) ABSTRACT

A system for diagnosing deterioration of a drive belt in a vehicle may include an engine, a motor connected to a shaft of a crankshaft of the engine via the drive belt to generate electric power, a controller for identifying slip of the drive belt and subsequently determining that deterioration of the drive belt is diagnosed (the "deterioration diagnosis") or slip of the drive belt is diagnosed as being due to friction of the engine (the "slip diagnosis") depending on whether conditions for diagnosing deterioration are fulfilled and then generating a torque adjustment command to adjust torque of the motor depending on the deterioration diagnosis or the slip diagnosis, and a main battery for supplying electric power to the motor in response to the torque adjustment command.

20 Claims, 3 Drawing Sheets

(51) Int. Cl.
  *F16H 57/01* (2012.01)
  *B60W 20/00* (2016.01)
  *B60L 15/20* (2006.01)
  *G07C 5/08* (2006.01)

(52) U.S. Cl.
  CPC ............ *F16H 57/01* (2013.01); *G07C 5/0825* (2013.01); *G07C 5/0833* (2013.01); *B60L 2240/423* (2013.01); *B60L 2240/48* (2013.01); *F16H 2057/014* (2013.01)

(58) Field of Classification Search
  CPC ............ F16H 2057/014; Y02T 10/7258; B60K 6/485; B60K 6/36; B60R 16/0232
  USPC .................. 701/22, 51, 67; 474/70, 94, 161; 324/765.01, 177; 702/65; 74/417; 123/564, 559.1
  See application file for complete search history.

(56) References Cited

U.S. PATENT DOCUMENTS

| | | | | |
|---|---|---|---|---|
| 2003/0069682 | A1* | 4/2003 | Iwatsuki | F16H 61/143 701/51 |
| 2007/0211241 | A1* | 9/2007 | Aizawa | G01N 21/94 356/237.2 |
| 2010/0283243 | A1* | 11/2010 | Armiroli | F02N 11/04 290/31 |
| 2012/0197473 | A1* | 8/2012 | Kshatriya | B60K 6/485 701/22 |
| 2016/0090006 | A1* | 3/2016 | Yamazaki | B60L 15/2063 701/22 |
| 2016/0327004 | A1* | 11/2016 | Cho | F02N 11/04 |

* cited by examiner

SYSTEM AND METHOD FOR DIAGNOSING DETERIORATION OF A DRIVE BELT IN A VEHICLE

CROSS-REFERENCE TO RELATED APPLICATION

The present application claims priority to Korean Patent Application No. 10-2016-0171447 filed on Dec. 15, 2016, the entire contents of which is incorporated herein for all purposes by this reference.

BACKGROUND OF THE INVENTION

Field of the Invention

The present invention relates to diagnosis of deterioration of a drive belt in a vehicle, and more particularly, to a system and a method for diagnosing deterioration of a drive belt due to slip of the drive belt.

Furthermore, the present invention also relates to a system and a method for indicating a request for replacement of the belt due to deterioration of the belt.

Description of Related Art

Generally, in hybrid vehicles, shortage of electric power ultimately requires increase in capacity of an alternator and a battery. Therefore, it is necessary to increase wiring/harness and/or weight of a vehicle.

In general, the maximum power capacity (e.g., up to about 2.5 kW) that can be supplied to an auxiliary battery for supplying electric power (e.g., output voltage of about 12V) to electric loads and the like is inevitably limited.

Meanwhile, since development and application of new technology parts have been expanded because of internal factors, electric power consumption is increasing accordingly. In addition, due to external factors, it is required to strengthen fuel efficiency and regulation of exhaust gas or to improve driving convenience.

Therefore, when more electric power than that provided by the auxiliary battery is required, a main battery having a different power system (e.g., output voltage of about 41V, 48V, etc.) is used in addition to the auxiliary battery.

A vehicle having such a structure is referred to as a Mild-Hybrid Electric Vehicle (HEV) or a Soft-HEV. In the case of a motor applied to such a Mild-HEV, the motor is connected to a crank pulley via a belt to provide torque assist to an engine or generate electrical energy by use of torque of the engine.

However, since torque applied to the belt is greater than that applied to a belt connected to a generally known alternator, it is required for the belt to have durability against a larger tension.

Deterioration of the belt is accelerated due to frequent torque assist, regenerative braking and restart after idle stop during vehicle running. When such belt deterioration progresses, there are problems that belt slip, noise and the like may occur.

Furthermore, when the belt slip occurs, there are problems that transmission efficiency of torque of the motor is lowered and hence effect of improving power performance and fuel efficiency cannot be accomplished through function of the HEV.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method for diagnosing deterioration of a drive belt in a vehicle, which are configured for diagnosing deterioration of the drive belt due to slip of the drive belt.

Various aspects of the present invention are directed to providing a system and a method for diagnosing deterioration of a drive belt in a vehicle, which are configured for indicating a request for replacement of the belt due to deterioration of the belt.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with one aspect of the present invention for accomplishing the object as mentioned above, there is provided a system for diagnosing deterioration of a drive belt in a vehicle, which is configured for diagnosing deterioration of the drive belt due to slip of the drive belt.

The system for diagnosing deterioration of a drive belt in a vehicle includes: an engine; a motor connected to a shaft of a crankshaft of the engine via a drive belt to generate electric power; a controller for identifying slip of the drive belt and subsequently determining that deterioration of the drive belt is diagnosed (hereinafter, the "deterioration diagnosis") or slip of the drive belt is diagnosed as being due to friction of the engine (hereinafter, the "slip diagnosis") depending on whether conditions for diagnosing deterioration are fulfilled and then generating a torque adjustment command to adjust torque of the motor depending on the deterioration diagnosis or the slip diagnosis; and a main battery for supplying electric power to the motor in response to the torque adjustment command.

In the instant case, the controller may comprise: a torque determination module for determining actual torque according to the number of revolution of the motor; a condition identification module for identifying whether slip of the belt occurs by use of the actual torque and a predetermined target torque; a diagnosis module for determining as the deterioration diagnosis or the slip diagnosis depending on whether conditions for diagnosing deterioration are fulfilled; and an adjustment module for generating the torque adjustment command.

In the instant case, the conditions for diagnosing deterioration are limited to the time when belt slip occurs after warm-up of the engine.

The warm-up may be a case where a water temperature value of the engine detected by a detector is greater than a predetermined first reference value and the time after the engine is driven is greater than a predetermined second reference value.

Furthermore, the system for diagnosing deterioration of a drive belt may further comprise a display module for outputting alarm information indicating requirement of replacing the drive belt when the deterioration diagnosis is determined.

The alarm information may be a combination of characters, sounds and graphics.

The system for diagnosing deterioration of a drive belt in a vehicle may comprise a converter connected to the main battery and an auxiliary battery for receiving charging power from the main battery through the converter.

The main battery may be a supercapacitor or a lithium ion battery.

The auxiliary battery may be a lead acid battery.

Furthermore, the motor may be an inverter integrated type mild hybrid starter and generator (MHSG).

Furthermore, the adjustment may be adjustment of torque assist or regenerative braking torque.

In accordance with another aspect of the present invention, there is provided a method for diagnosing deterioration of a drive belt in a vehicle including: identifying slip of the drive belt by a controller; diagnosing, by the controller, to determine that the drive belt deteriorates (hereinafter, the "deterioration diagnosis") or slip of the drive belt is due to friction of an engine (hereinafter, the "slip diagnosis") depending on whether conditions for diagnosing deterioration are fulfilled after the controller identifies the slip of the drive belt; generating, by the controller, a torque adjustment command for adjusting torque of the motor depending on the deterioration diagnosis or the slip diagnosis; supplying electric power from a main battery to the motor connected to a shaft of a crankshaft of the engine via the drive belt according to the torque adjustment command; and generating electric power by the motor.

In the instant case, the step of identifying slip of the belt includes determining, by a torque determination module, actual torque according to the number of revolution of the motor; and identifying, by a condition identification module, whether slip of the belt occurs by use of the actual torque and a predetermined target torque.

The step of diagnosing includes determining, by a diagnosis module, as the deterioration diagnosis or the slip diagnosis depending on whether conditions for diagnosing deterioration are fulfilled.

The step of generating the torque adjustment command includes generating, by the adjustment module, the torque adjustment command.

Moreover, the step of generating a torque adjustment command may further comprise outputting alarm information indicating requirement of replacing the drive belt to a display module when the deterioration diagnosis is determined by the controller.

Furthermore, the step of generating electric power includes supplying charging power from a main battery to an auxiliary battery through a converter connected to the main battery.

According to an exemplary embodiment of the present invention, it is possible to precisely diagnose whether deterioration of a drive belt due to slip of the drive belt occurs.

Another effect of the present invention is that improvement of power performance and/or fuel efficiency performance can be kept continuously by indicating a request for replacement of a belt due to its deterioration and hence inducing repair of the belt.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
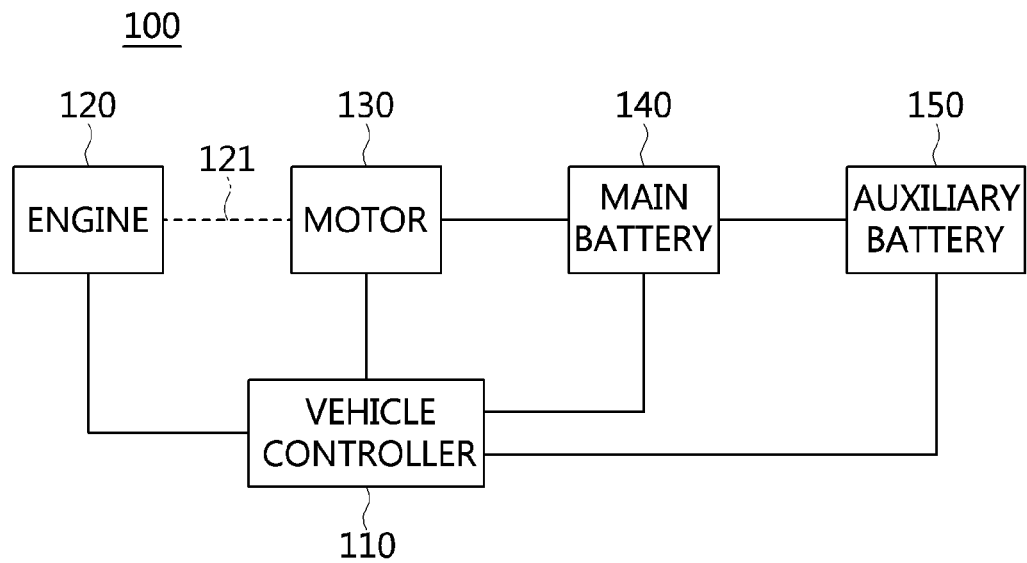
FIG. 1 is a block diagram of a system for diagnosing deterioration of a drive belt in a vehicle, according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention may be implemented in many altered forms and have various embodiments. Therefore, an exemplary specific embodiment is illustrated in the drawings and described in detail in the following description. However, the disclosure herein is not intended to limit the present invention to a specific embodiment and should be understood as covering all modifications, equivalents and substitutions falling within the spirit and scope of the invention.

Like reference numerals are used to designate like elements throughout the drawings and the description with reference to the drawings. Although the terms "first," "second," etc. may be used herein to describe various components, these components should not be limited by these terms. These terms are used merely to distinguish one element from another.

For example, a first component may be designated as a second component and similarly a second component may be designated as a first component without departing from the scope of the present invention. The term "and/or" includes all combinations or any of a plurality of the associated listed items.

All terms including technical or scientific terms, unless being defined otherwise, have the same meaning generally understood by a person having ordinary skill in the art pertaining to the present invention.

The terms that are the same as the ones defined in a commonly-used dictionary should be interpreted as including the meaning consistent with the meaning in the context of the related art, and should not be interpreted as being ideally or excessively formal meaning unless they are explicitly defined otherwise herein.

Hereinafter, a system and a method for diagnosing deterioration of a drive belt in a vehicle according to an exemplary embodiment of the present invention will be described in detail with reference to the accompanying drawings.

FIG. 1 is a block diagram of a configuration of a system 100 for diagnosing deterioration of a drive belt in a vehicle, according to an exemplary embodiment of the present invention. Referring to FIG. 1, a system 100 for diagnosing deterioration of a drive belt in a vehicle may comprise: a controller 110 for exchanging and controlling signals and data between components disposed in the vehicle; an engine 120; a motor 130 connected to a shaft of a crankshaft of the engine 120 through a drive belt 121 to generate electric power; a main battery 140 for supplying power source (i.e., electric power) to the motor 130; and an auxiliary battery 150 which is supplied with electric power for charging the battery from the main battery 140.

The controller 110 identifies belt slip of the drive belt 121. After identifying the belt slip, the controller determines that deterioration of the drive belt is diagnosed (the "deterioration diagnosis") or slip of the drive belt is diagnosed as being due to friction of the engine (the "deterioration diagnosis") depending on whether conditions for diagnosing deterioration are fulfilled, and then generates a torque adjustment command to adjust torque of the motor depending on the deterioration diagnosis or the slip diagnosis.

The drive belt 121 is connected to a crank pulley assembled to the shaft of the crankshaft at the engine 120 side. Therefore, deterioration of the drive belt may cause slippage at the time when the drive belt is operated, resulting in generation of noise and/or fluctuation of revolution per minute (RPM) and the like.

In the instant case, torque transmission efficiency of the motor 130 is lowered and hence effect of torque assist and/or fuel efficiency, which are main function of the vehicle, cannot be accomplished.

Therefore, in an exemplary embodiment of the present invention, the slip diagnosis or the deterioration diagnosis is decided to prevent such defect.

The engine 120 may be any one selected from an engine fueled by gasoline including a CVVT (Continuous Variable Valve Timing) engine, a DOHC (Double Over Head Camshaft) engine, a CVT (Continuous Valve Timing) engine, a GDI (Gasoline Direct Injection) engine and an MPI (Multi Point Injection) engine; an engine fueled by diesel including a CRDI (Common Rail Direct Injection) engine, an HTI (High direction Turbo Intercooler) engine and a VGT (Variable Geometry Turbocharge) engine; and an engine fueled by liquified gas including an LPi (Liquid Propane injection) engine.

The motor 130 may be an inverter integrated type MHSG (Mild Hybrid Starter and Generator). In other words, the motor 130 may be configured to encompass function of an inverter. Therefore, it is possible to convert electric power of three-phase alternating current, which is generated in the motor 130, into direct current and output it, or conversely, convert direct current into three-phase alternating current to drive the motor 130.

The motor 130 is of a permanent magnet type and includes electromagnets unlike a FULL Hybrid Electric Vehicle (HEV) motor. That is, a stator is of a permanent magnet type and a rotor includes electromagnets. Therefore, to drive the motor 130, excitation current for prefluxing the electromagnets of the rotor may be supplied.

Furthermore, the motor 130 receives seed electric power from the main battery 140, and can perform power generation when it is supplied with electric current for initial magnetization. It is natural that the motor 130 is controlled such that a deterioration coefficient is reflected to torque assist or regenerative braking torque depending on the degree of deterioration so as not to generate continuous slippage of the drive belt 121.

The engine 120 and the motor 130 are connected by a connecting device including the drive belt 121. Therefore, in a general operation mode, the motor 130 is in a state that it does not generate electric power even when the engine 120 drives. That is, only when the excitation current is applied to the motor 130, the rotor of the motor 130 is magnetized and hence the motor starts to generate electric power.

Accordingly, when there is a failure in the main battery 140, the auxiliary battery 150 may flow separate excitation current to the motor 130 to magnetize the rotor of the motor 130 so that the motor can perform power generation operation. It is natural that the motor can perform not only the present power generation operation but also torque assist operation.

The main battery 140 may be a super capacitor or a lithium ion battery. Besides, it is natural that the battery may be a high voltage battery for electric vehicles including a nickel metal battery, a lithium ion battery, a lithium polymer battery, an all-solid-state battery and the like. Furthermore, the main battery 140 may be a single battery cell, or otherwise a battery pack including battery cells connected in series and/or in parallel.

The battery cell may be a cylindrical cell, a prismatic cell, a pouch-shaped cell, or the like. The pouch-shaped cell includes a flexible cover including a thin film, in which electrical components of the battery cell are disposed.

The pouch-shaped cell, inter alia, is used to implement optimum space utilization within a single battery cell. The pouch-shaped cell is also characterized by small weight as well as high capacity.

Edge portions of such pouch-shaped cell include sealing joints. In other words, the joint connects two thin films of battery cells, while a cavity formed between the thin films includes additional components.

The main battery 140 may have an output voltage of about 48V, but is not limited thereto.

The auxiliary battery 150 may be a lead acid battery, but is not limited thereto. The auxiliary battery may also be a nickel metal battery, a lithium polymer battery, or a lithium ion battery.

The auxiliary battery 150 receives charging power from the main battery 140 and hence is charged. Furthermore, when the main battery 140 fails, seed electric power (e.g., about 12V) may be supplied to the motor 130 under the control of the controller 110.

The controller 110 generates a torque adjustment command for adjusting torque of the motor 130 based on the deterioration diagnosis or the slip diagnosis and hence controls the torque of the motor 130 by controlling the main battery 140.

The engine 120 and/or the motor 130 shown in FIG. 1 comprise controllers for controlling them respectively. In other words, an engine controller is configured to control the engine 120 and a motor controller is configured to control the motor 130. It is natural that the engine controller and the motor controller exchange signals, data and the like with the controller 110.

Furthermore, battery management systems (BMSs) for managing the main battery 140 and the auxiliary battery 150 may be configured separately in the batteries themselves.

Figure 2:
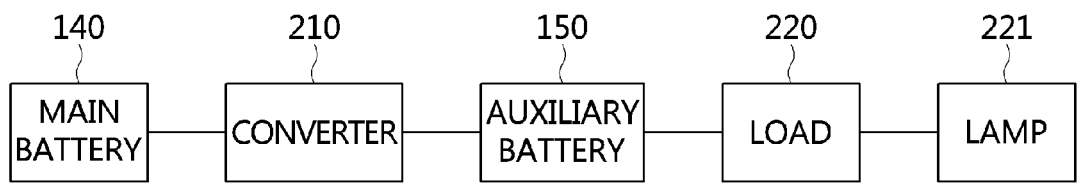
FIG. 2 is a block diagram of a configuration in which a converter and an electric load are comprised in a system for diagnosing deterioration of a drive belt in a vehicle, which is shown in FIG. 1.

FIG. 2 is a block diagram of a configuration in which a converter and an electric load are comprised in a system for diagnosing deterioration of a drive belt in a vehicle, which is shown in FIG. 1. Referring to FIG. 2, a converter 210 is disposed between the main battery 140 and the auxiliary battery 150. The converter 210 is a bidirectional converter, which performs step-down or step-up of voltage. In other words, when the main battery 140 is normal, feed forward output control is performed. Therefore, output voltage from the main battery 140 is regulated and then supplied to the auxiliary battery 150. For example, in the case of feed forward output control, the converter 210 converts 48V to 12V and supplies it to the auxiliary battery 150.

On the other hand, when the main battery 140 fails to operate, feed backward output control is performed. Therefore, output voltage from the auxiliary battery 150 is regulated and then supplied to the motor 130. For example, in the case of feed backward output control, the converter 210 converts 12V to 48V and supplies it to the motor 130.

Therefore, the converter 210 may be a direct current-direct current converter (DC-DC converter) as a bidirectional converter. The converter may be a low voltage DC-DC (LDC) converter. Of course, the converter 210 includes a boost and a buck circuit.

On the other hand, the auxiliary battery 150 supplies electric power to the load 220. The load 220 may be electric components including a lamp 221 and the like. The lamp 221 may be a warning lamp for indicating deterioration diagnosis of the drive belt, when it is determined.

Figure 3:
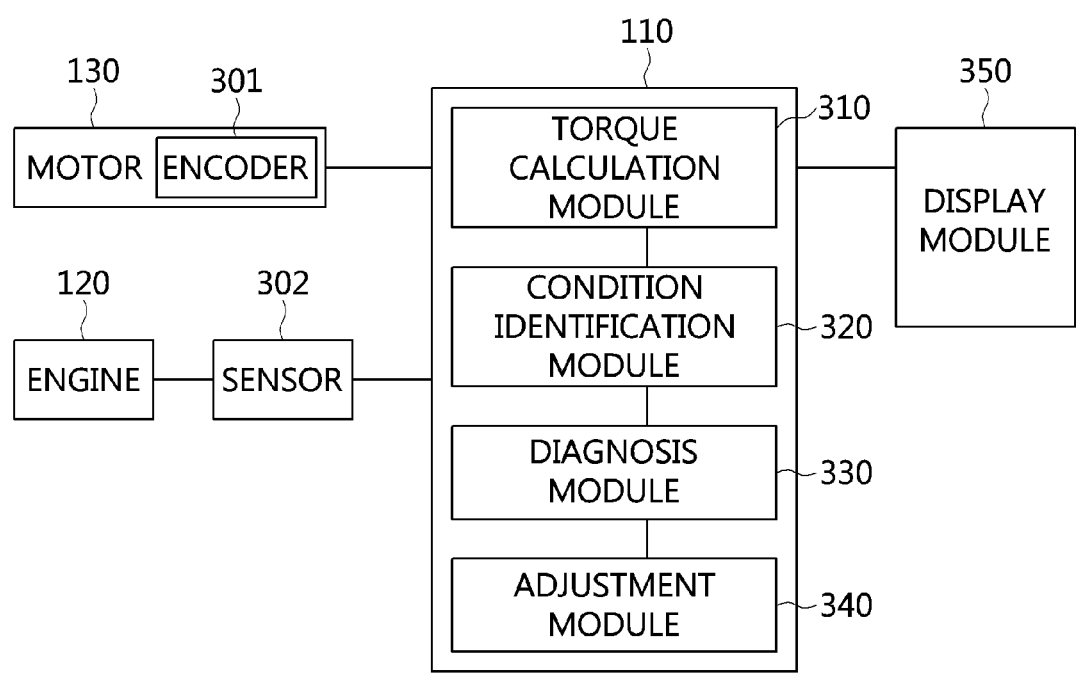
FIG. 3 is a detailed block diagram of a system for diagnosing deterioration of a drive belt in a vehicle, which is shown in FIG. 1.

FIG. 3 is a detailed block diagram of a system for diagnosing deterioration of a drive belt in a vehicle, which is shown in FIG. 1. Referring to FIG. 3, the motor 130 is provided with an encoder 301 for determining the number of rotation per minute (RPM) of the motor, while a detector 302 for determining water temperature of the engine is attached to the engine 120.

Of course, it is also possible to use a speed detector instead of the encoder 301.

The controller 110 may comprise a torque determination module 310 for determining actual torque according to the number of revolution of the motor; a condition identification module 320 for identifying whether belt slip occurs by use of the actual torque and a predetermined target torque; a diagnosis module 330 for determining as the deterioration diagnosis or the slip diagnosis depending on whether conditions for diagnosing deterioration are fulfilled; and an adjustment module 340 for generating the torque adjustment command.

The torque determination module 310 determines actual torque based on the actual number of revolution of the motor to determine whether a slip phenomenon occurs on the drive belt 121 (see FIG. 1), and compares the actual torque with the target torque. That is, when the actual torque is less than the target torque, means that the slip phenomenon occurs on the drive belt. The target torque may be received from a host controller, or otherwise stored in the controller 110 itself.

A display module 340 displays alarm information for notifying requirement of replacing the drive belt 121 when it is determined that deterioration of the drive belt 121 is diagnosed. The present alarm information may be a combination of characters, sounds and graphics. Furthermore, for the present purpose, the display module 340 may comprise a sound system, a display system and the like. Moreover, the display module 340 may also comprise an instrument cluster of a vehicle.

Figure 4:
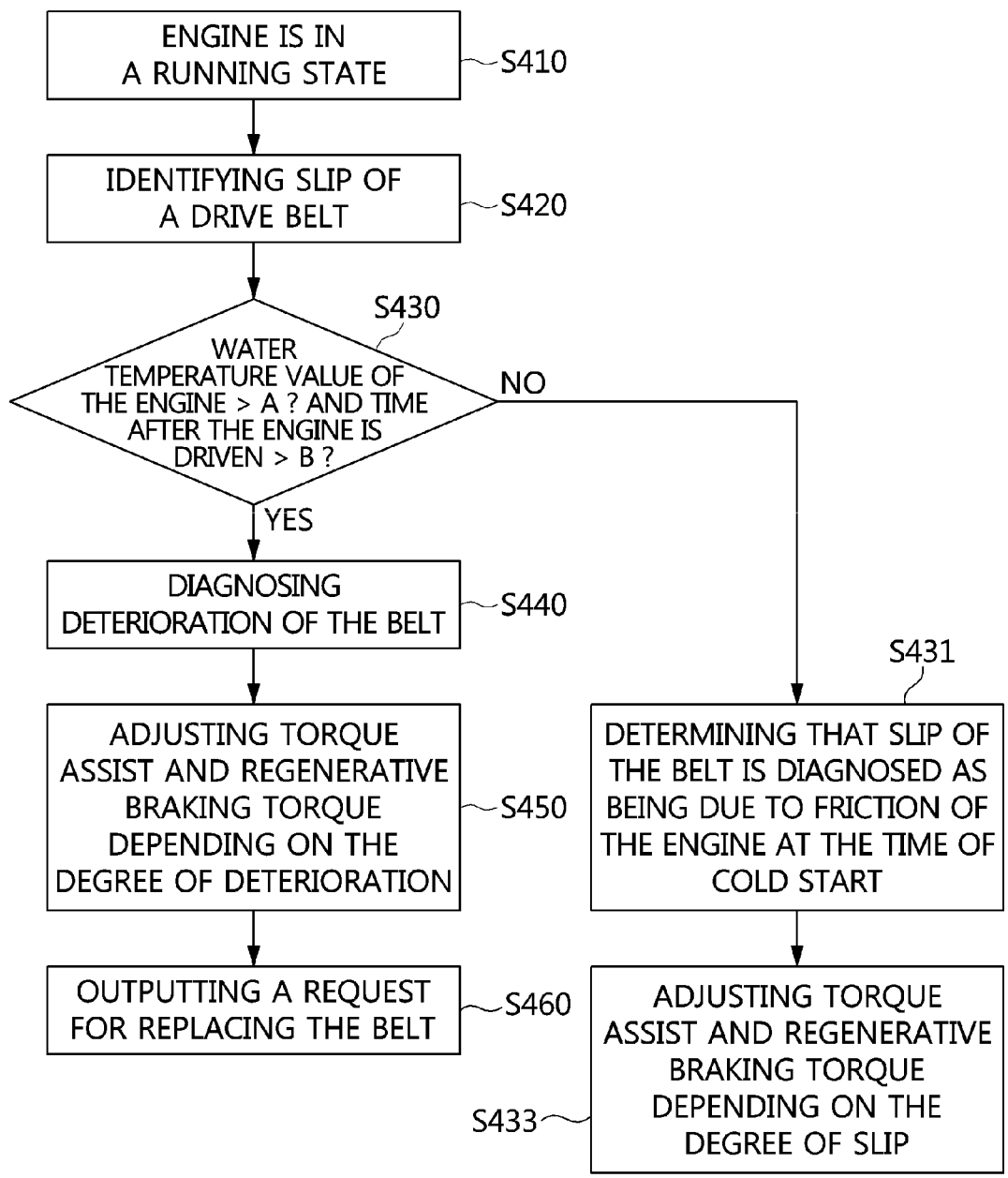
FIG. 4 is a flow chart illustrating process of diagnosing deterioration, according to an exemplary embodiment of the present invention.

FIG. 4 is a flow chart illustrating process of diagnosing deterioration, according to an exemplary embodiment of the present invention. Referring to FIG. 4, when a driver starts the vehicle, the engine 120 runs according to the start command at step S410.

As such, the controller 110 (see FIG. 1) identifies belt slip of the drive belt 121 (see FIG. 1) at step S420.

Subsequently, after identifying the belt slip, the controller 110 determines whether conditions for diagnosing deterioration are fulfilled at step S430. Furthermore, the conditions for diagnosing deterioration are limited to the time when the belt slip occurs after warm-up of the engine 120. The reason for limiting the condition for diagnosing deterioration diagnosis to the time when the belt slip occurs after warm-up of the engine is that: when the belt slip occurs due to motor torque assist and regenerative braking torque in the cold start state, it is not possible to distinguish whether the belt slip is caused due to engine friction, or otherwise due to deterioration of the belt.

Therefore, process of identifying the warm-up state of the engine is required. The present warm-up state may be a case where a water temperature value of the engine detected by the detector is greater than a predetermined first reference value A and the time after the engine is driven is greater than a predetermined second reference value B.

At step S430, when the conditions for diagnosing deterioration are fulfilled, it is determined that deterioration of the belt is diagnosed. As such, the process proceeds to steps S440 and S450 where the torque assist and the regenerative braking torque are adjusted depending on the degree of deterioration.

In addition, when it is determined that deterioration of the belt is diagnosed, This means that deterioration occurs in the drive belt 121 itself. Therefore, a request for replacing the belt is output at step S460.

On the other hand, when the conditions for diagnosing deterioration are not fulfilled at the step S430, then it is determined that the slip of the belt is diagnosed as being due to friction of the engine at the time of cold start at step S431.

Thereafter, the torque assist and the regenerative braking torque are adjusted depending on the degree of slip at step S433.

A basic amount of each of the torque assist and the regenerative braking torque is adjusted to inhibit occurrence of slip after deterioration and/or slip are diagnosed.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for diagnosing deterioration of a drive belt in a vehicle comprising:
   an engine;
   a motor connected to a shaft of a crankshaft of the engine via the drive belt to generate electric power;
   a controller configured for identifying slip of the drive belt and subsequently determining that deterioration of the drive belt is diagnosed (the "deterioration diagnosis") or the slip of the drive belt is diagnosed as being due to friction of the engine (the "slip diagnosis") depending on whether conditions for diagnosing deterioration are fulfilled and then generating a torque adjustment command to adjust torque of the motor depending on the deterioration diagnosis or the slip diagnosis; and
   a main battery supplying electric power to the motor in a response to the torque adjustment command.

2. The system according to claim 1, wherein the controller includes:
   a torque determination module for determining the torque according to a number of revolution of the motor;
   a condition identification module for identifying whether the slip of the drive belt occurs by use of the torque and a predetermined target torque;
   a diagnosis module for determining as the deterioration diagnosis or the slip diagnosis depending on whether the conditions for diagnosing deterioration are fulfilled; and
   an adjustment module for generating the torque adjustment command.

3. The system according to claim 1, wherein the conditions for diagnosing deterioration are limited to a time when the slip of drive belt occurs after warm-up of the engine.

4. The system according to claim 3, wherein the warm-up is a case where a water temperature value of the engine detected by a detector is greater than a predetermined first reference value and a time after the engine is driven is greater than a predetermined second reference value.

5. The system according to claim 1, further including a display module for outputting alarm information indicating requirement of replacing the drive belt when the deterioration diagnosis is determined.

6. The system according to claim 5, wherein the alarm information includes characters, sounds and graphics.

7. The system according to claim 1, further including a converter connected to the main battery and an auxiliary battery for receiving charging power from the main battery through the converter.

8. The system according to claim 7, wherein the main battery is a super capacitor or a lithium ion battery and the auxiliary battery is a lead acid battery.

9. The system according to claim 1, wherein the motor is an inverter integrated type mild hybrid starter and generator (MHSG).

10. The system according to claim 1, wherein the adjustment is adjustment of torque assist or regenerative braking torque.

11. A method for diagnosing deterioration of a drive belt in a vehicle comprising:
    identifying slip of the drive belt by a controller;
    diagnosing, by the controller, to determine that the drive belt deteriorates (the "deterioration diagnosis") or the slip of the drive belt is due to friction of an engine (the "slip diagnosis") depending on whether conditions for diagnosing deterioration are fulfilled after the controller identifies the slip of the drive belt;
    generating, by the controller, a torque adjustment command for adjusting torque of the motor depending on the deterioration diagnosis or the slip diagnosis;
    supplying electric power from a main battery to the motor connected to a shaft of a crankshaft of the engine via the drive belt according to the torque adjustment command; and
    generating electric power by the motor.

12. The method according to claim 11, wherein the step of identifying the slip of the drive belt includes determining, by a torque determination module, the torque according to a number of revolution of the motor, and identifying, by a condition identification module, whether the slip of the drive belt occurs by use of the torque and a predetermined target torque;
    the step of diagnosing includes determining, by a diagnosis module, as the deterioration diagnosis or the slip diagnosis depending on whether the conditions for diagnosing deterioration are fulfilled; and
    the step of generating the torque adjustment command includes generating, by the adjustment module, the torque adjustment command.

13. The method according to claim 11, wherein the conditions for diagnosing deterioration are limited to a time when the slip of the drive belt occurs after warm-up of the engine.

14. The method according to claim 13, wherein the warm-up is a case where a water temperature value of the engine detected by a detector is greater than a predetermined first reference value and a time after the engine is driven is greater than a predetermined second reference value.

15. The method according to claim 11, wherein the step of generating the torque adjustment command further includes outputting alarm information indicating requirement of replacing the drive belt to a display module when the deterioration diagnosis is determined by the controller.

16. The method according to claim 15, wherein the alarm information includes characters, sounds and graphics.

17. The method according to claim 11, wherein the step of generating the electric power includes supplying charging power from the main battery to an auxiliary battery through a converter connected to the main battery.

18. The method according to claim 17, wherein the main battery is a super capacitor or a lithium ion battery and the auxiliary battery is a lead acid battery.

19. The method according to claim 11, wherein the motor is an inverter integrated type mild hybrid starter and generator (MHSG).

20. The method according to claim 11, wherein the adjustment is adjustment of torque assist or regenerative braking torque.

* * * * *